(12) United States Patent
Pike

(10) Patent No.: US 11,048,790 B2
(45) Date of Patent: *Jun. 29, 2021

(54) AUTHENTICATION METHODS AND SYSTEMS

(71) Applicants: LICENTIA GROUP LIMITED, South Glamorgan (GB); MYPINPAD LIMITED, South Glamorgan (GB)

(72) Inventor: Justin Pike, Blackwood (GB)

(73) Assignees: LICENTIA GROUP LIMITED, Cardiff (GB); MYPINPAD LIMITED, Cardiff (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/576,896

(22) PCT Filed: May 27, 2016

(86) PCT No.: PCT/GB2016/051548
§ 371 (c)(1),
(2) Date: Nov. 27, 2017

(87) PCT Pub. No.: WO2016/189322
PCT Pub. Date: Dec. 1, 2016

(65) Prior Publication Data
US 2018/0150628 A1    May 31, 2018

(30) Foreign Application Priority Data

May 27, 2015  (GB) ........................ 1509030
May 27, 2015  (GB) ........................ 1509031
(Continued)

(51) Int. Cl.
*H04L 29/06* (2006.01)
*G06F 21/36* (2013.01)
(Continued)

(52) U.S. Cl.
CPC ............ *G06F 21/36* (2013.01); *G06F 3/0489* (2013.01); *G06F 3/04886* (2013.01);
(Continued)

(58) Field of Classification Search
CPC ...... G06F 21/36; G06F 3/04886; G06F 7/582; G06F 7/588; G06F 3/0489; G06F 21/32;
(Continued)

(56) References Cited

U.S. PATENT DOCUMENTS 2,819,067 A    1/1958  Dusenbury
3,176,324 A    4/1965  Birgbauer, Sr.
(Continued)

FOREIGN PATENT DOCUMENTS

CN    100583113 C    3/2005
CN    101082948 A    12/2007
(Continued)

OTHER PUBLICATIONS https://patentscope.wipo.int/search/en/detail.jsf?docId=WO2011116570&tab=PCTBIBLIO&maxRec=1000 (Year: 2010).*
(Continued)

*Primary Examiner* — Carl G Colin
*Assistant Examiner* — Hany S. Gadalla
(74) *Attorney, Agent, or Firm* — Gordon & Jacobson, P.C.

(57) ABSTRACT

The invention provides a solution for secure authentication of an individual. The invention comprises methods and apparatus for secure input of a user's identifier e.g. PIN. An image of a keypad is superimposed over an operable keypad within a display zone of a screen associated with an electronic device. The keypad image and/or the operable keypad are generated by the device using a scrambled or randomised keypad configuration generated on or at the electronic device. The configuration or order of keys depicted in the
(Continued)

image may or may not be scrambled or randomised. Thus, the order of keys depicted in the image do not correspond to the order of the keys in the operable keypad, so that when the user selects a 'key' depicted in the image on the screen, the underlying operable keypad is caused to operate and an encoded version of the user's input is received into memory on the device. The encoded input can be sent for decoding on a remote computer. The keypad configurations used for generation of the operable keypad(s) and/or keypad image(s) are generated using an input. The input could be a true or pseudo random number or biometric data relating to a user of the device. The device may be a mobile phone, a tablet computer, laptop, PC, payment terminal or any other electronic computing device with a screen.

36 Claims, 1 Drawing Sheet

(30) Foreign Application Priority Data

Nov. 24, 2015 (GB) .................................. 1520741
Nov. 24, 2015 (GB) .................................. 1520760

(51) Int. Cl.

| | | |
|---|---|---|
| G06Q 20/32 | (2012.01) | |
| G06Q 20/40 | (2012.01) | |
| G07F 7/10 | (2006.01) | |
| G06F 21/32 | (2013.01) | |
| G06Q 20/20 | (2012.01) | |
| G06F 3/0488 | (2013.01) | |
| G06F 3/0489 | (2013.01) | |
| G06Q 20/10 | (2012.01) | |
| G06F 7/58 | (2006.01) | |
| G06Q 20/38 | (2012.01) | |
| H04L 9/08 | (2006.01) | |
| G06Q 20/36 | (2012.01) | |

(52) U.S. Cl.
CPC .......... *G06F 21/32* (2013.01); *G06Q 20/1085* (2013.01); *G06Q 20/206* (2013.01); *G06Q 20/32* (2013.01); *G06Q 20/3226* (2013.01); *G06Q 20/4012* (2013.01); *G06Q 20/4014* (2013.01); *G06Q 20/40145* (2013.01); *G07F 7/1033* (2013.01); *G07F 7/1041* (2013.01); *G07F 7/1075* (2013.01); *G07F 7/1091* (2013.01); *G06F 7/582* (2013.01); *G06F 7/588* (2013.01); *G06Q 20/36* (2013.01); *G06Q 20/3829* (2013.01); *G06Q 2220/00* (2013.01); *H04L 9/0866* (2013.01); *H04L 2209/08* (2013.01)

(58) Field of Classification Search
CPC .............. G06Q 20/36; G06Q 20/1085; G06Q 20/4012; G06Q 20/206; G06Q 20/40145; G06Q 20/4014; G06Q 20/3226; G06Q 20/32; G06Q 20/3829; G06Q 2220/00; G07F 7/1091; G07F 7/1075; G07F 7/1041; G07F 7/1033; H04L 2209/08; H04L 9/0866; H04L 9/3231
See application file for complete search history.

(56) References Cited

U.S. PATENT DOCUMENTS

| | | |
|---|---|---|
| 3,201,732 A | 8/1965 | Olsen |
| 3,255,323 A | 6/1966 | Austin |
| 3,270,720 A | 9/1966 | Ehrhardt |
| 3,347,103 A | 10/1967 | High |
| 3,364,601 A | 1/1968 | Korenek |
| 3,375,428 A | 3/1968 | Mitchell |
| 3,392,846 A | 7/1968 | Getzin |
| 3,413,071 A | 11/1968 | Davis |
| 3,621,242 A | 11/1971 | Ferguson |
| 3,762,876 A | 10/1973 | Koehler |
| 3,965,066 A | 6/1976 | Sterman |
| 5,193,152 A | 3/1993 | Smith |
| 5,209,102 A | 5/1993 | Wang |
| 5,219,794 A | 6/1993 | Satoh |
| 5,234,389 A | 8/1993 | Goates |
| 5,257,486 A | 11/1993 | Holmwall |
| 5,363,449 A | 11/1994 | Bestock |
| 5,504,808 A | 4/1996 | Hamrick, Jr. |
| 5,549,194 A | 8/1996 | Dag |
| 5,715,078 A | 2/1998 | Shiraishi |
| 5,754,652 A | 5/1998 | Wilfong |
| 5,949,348 A | 9/1999 | Kapp |
| 5,990,586 A | 11/1999 | Milano, Jr. |
| 6,193,152 B1 | 2/2001 | Fernando |
| 6,209,102 B1 | 3/2001 | Hoover |
| 6,219,794 B1 | 4/2001 | Soutar |
| 6,234,389 B1 | 5/2001 | Valliani |
| 6,257,486 B1 | 7/2001 | Teicher |
| 6,434,702 B1 * | 8/2002 | Maddalozzo, Jr. ... G06F 3/0238 382/115 |
| 6,549,194 B1 | 4/2003 | McIntyre |
| 6,630,928 B1 | 10/2003 | McIntyre |
| 6,671,405 B1 | 12/2003 | Savakis |
| 6,715,078 B1 | 3/2004 | Chasko |
| 6,990,586 B1 | 1/2006 | Tresser |
| 7,003,316 B1 | 2/2006 | Elias |
| 7,010,806 B2 | 3/2006 | Bender |
| 7,047,222 B1 | 5/2006 | Bush |
| 7,091,845 B2 | 8/2006 | Midland |
| 7,092,915 B2 | 8/2006 | Best |
| 7,243,237 B2 | 7/2007 | Peinado |
| 7,305,565 B1 | 12/2007 | Lungaro |
| 7,395,506 B2 | 7/2008 | Tan |
| 7,698,563 B2 | 4/2010 | Shin |
| 7,735,121 B2 | 6/2010 | Madani |
| 7,992,007 B2 | 8/2011 | Lazzaro |
| 8,117,458 B2 | 2/2012 | Osborn, III |
| 8,176,324 B1 | 5/2012 | Krishnamurthy |
| 8,201,732 B1 | 6/2012 | Kropf |
| 8,255,323 B1 | 8/2012 | Casey |
| 8,270,720 B1 | 9/2012 | Ladd |
| 8,297,173 B1 | 10/2012 | Teetzel |
| 8,347,103 B2 | 1/2013 | Jones |
| 8,364,601 B2 | 1/2013 | Dewan |
| 8,375,428 B2 | 2/2013 | Won |
| 8,392,846 B2 | 3/2013 | Carapelli |
| 8,413,071 B2 | 4/2013 | Kim |
| 8,453,027 B2 | 5/2013 | Bartz |
| 8,453,207 B1 | 5/2013 | White |
| 8,621,242 B2 | 12/2013 | Brown |
| 8,762,876 B2 | 6/2014 | Puppin |
| 8,965,066 B1 | 2/2015 | Derakhshani |
| 9,082,253 B1 | 7/2015 | Harty |
| 9,235,967 B1 | 1/2016 | Magee |
| 9,552,465 B2 | 1/2017 | Pike |
| 9,576,411 B2 | 2/2017 | Kim |
| 10,108,796 B2 | 10/2018 | Lo |
| 10,366,215 B2 | 7/2019 | Pike |
| 2002/0016918 A1 | 2/2002 | Tucker |
| 2002/0023215 A1 | 2/2002 | Wang |
| 2002/0029342 A1 | 3/2002 | Keech |
| 2002/0046185 A1 | 4/2002 | Villart |
| 2002/0082962 A1 | 6/2002 | Farris |
| 2002/0012397 A1 | 9/2002 | Hodgson |
| 2002/0129250 A1 | 9/2002 | Kimura |
| 2002/0188872 A1 | 12/2002 | Willeby |
| 2003/0002667 A1 | 1/2003 | Gougeon |
| 2003/0004877 A1 | 1/2003 | Kasasaku |
| 2003/0120612 A1 | 6/2003 | Fujisawa |
| 2003/0120936 A1 | 6/2003 | Farris |
| 2003/0132918 A1 | 7/2003 | Fitch |

(56) References Cited

U.S. PATENT DOCUMENTS

| | | |
|---|---|---|
| 2003/0212327 A1 | 11/2003 | Wang |
| 2003/0229597 A1 | 12/2003 | De Jong |
| 2003/0229598 A1 | 12/2003 | De Jong |
| 2003/0229791 A1 | 12/2003 | De Jong |
| 2004/0010690 A1 | 1/2004 | Shin |
| 2004/0039933 A1 | 2/2004 | Martin |
| 2004/0044739 A1 | 3/2004 | Ziegler |
| 2004/0073809 A1 | 4/2004 | Wing Keong |
| 2004/0122768 A1 | 6/2004 | Creamer |
| 2004/0122771 A1 | 6/2004 | Celi |
| 2004/0182921 A1 | 9/2004 | Dickson |
| 2005/0010786 A1 | 1/2005 | Michener |
| 2005/0012715 A1 | 1/2005 | Ford |
| 2005/0036611 A1 | 2/2005 | Seaton |
| 2005/0043997 A1 | 2/2005 | Sahota |
| 2005/0075973 A1 | 4/2005 | Yousofi |
| 2005/0127156 A1 | 6/2005 | Yoo |
| 2005/0127158 A1 | 6/2005 | Figueras |
| 2005/0140832 A1 | 6/2005 | Goldman |
| 2005/0144449 A1 | 6/2005 | Voice |
| 2005/0146447 A1 | 7/2005 | Na |
| 2005/0177522 A1 | 8/2005 | Williams |
| 2005/0193208 A1 | 9/2005 | Charrette, III |
| 2005/0212763 A1 | 9/2005 | Okamura |
| 2006/0003706 A1 | 1/2006 | Welland |
| 2006/0017691 A1 | 1/2006 | Cruz-Hernandez |
| 2006/0018467 A1 | 1/2006 | Steinmetz |
| 2006/0026440 A1 | 2/2006 | Sauvebois |
| 2006/0032705 A1 | 2/2006 | Isham |
| 2006/0037067 A1 | 2/2006 | Morris |
| 2006/0053301 A1 | 3/2006 | Shin |
| 2006/0104446 A1 | 5/2006 | Varghese |
| 2006/0133597 A1 | 6/2006 | Song |
| 2006/0136334 A1 | 6/2006 | Atkinson |
| 2006/0146169 A1 | 7/2006 | Segman |
| 2006/0149845 A1 | 7/2006 | Malin |
| 2006/0155619 A1 | 7/2006 | Rhiando |
| 2006/0182715 A1 | 8/2006 | Sandrock |
| 2006/0206919 A1 | 9/2006 | Montgomery |
| 2006/0221059 A1 | 10/2006 | Choi |
| 2006/0224523 A1 | 10/2006 | Elvitigala |
| 2006/0247533 A1 | 11/2006 | Abe |
| 2007/0005500 A1 | 1/2007 | Steeves |
| 2007/0014415 A1 | 1/2007 | Harrison |
| 2007/0073937 A1 | 3/2007 | Feinberg |
| 2007/0089164 A1 | 4/2007 | Gao |
| 2007/0101150 A1 | 5/2007 | Oda |
| 2007/0110224 A1 | 5/2007 | Gumpel |
| 2007/0182715 A1 | 8/2007 | Fyke |
| 2007/0209014 A1 | 9/2007 | Youmtoub |
| 2007/0213090 A1* | 9/2007 | Holmberg ............ G06F 3/04886 |
| | | 455/550.1 |
| 2007/0279391 A1 | 12/2007 | Marttila |
| 2007/0282756 A1 | 12/2007 | Dravenstott |
| 2008/0011098 A1 | 1/2008 | Herremans |
| 2008/0014818 A1 | 1/2008 | Privitera |
| 2008/0110981 A1 | 5/2008 | Deline |
| 2008/0148186 A1 | 6/2008 | Krishnamurthy |
| 2008/0165035 A1 | 7/2008 | Bhella |
| 2008/0168546 A1 | 7/2008 | Almeida |
| 2008/0172735 A1 | 7/2008 | Gao |
| 2008/0184036 A1* | 7/2008 | Kavsan .................. G06F 21/36 |
| | | 713/184 |
| 2008/0209223 A1 | 8/2008 | Nandy |
| 2008/0251969 A1 | 10/2008 | Isham |
| 2008/0280652 A1 | 11/2008 | Marry |
| 2008/0289035 A1 | 11/2008 | Delia |
| 2008/0306995 A1 | 12/2008 | Newell |
| 2008/0319902 A1 | 12/2008 | Chazan |
| 2009/0033522 A1 | 2/2009 | Skillman |
| 2009/0044282 A1 | 2/2009 | Govindaraju |
| 2009/0066660 A1 | 3/2009 | Ure |
| 2009/0067627 A1 | 3/2009 | Hogl |
| 2009/0077383 A1 | 3/2009 | De Monseignat |
| 2009/0106827 A1 | 4/2009 | Cerruti |
| 2009/0183098 A1* | 7/2009 | Casparian ............ G06F 3/0238 |
| | | 715/765 |
| 2009/0193210 A1 | 7/2009 | Hewett |
| 2009/0213132 A1* | 8/2009 | Kargman ................ G06F 21/36 |
| | | 345/581 |
| 2009/0235199 A1 | 9/2009 | Mastie |
| 2009/0254986 A1 | 10/2009 | Harris |
| 2009/0270078 A1* | 10/2009 | Nam .................... H04M 1/7258 |
| | | 455/414.1 |
| 2009/0277968 A1 | 11/2009 | Walker |
| 2009/0328197 A1* | 12/2009 | Newell .................... G06F 21/36 |
| | | 726/18 |
| 2010/0036783 A1 | 2/2010 | Rodriguez |
| 2010/0049768 A1 | 2/2010 | Robert |
| 2010/0098300 A1 | 4/2010 | Otto |
| 2010/0109920 A1* | 5/2010 | Spradling ............... G06F 21/36 |
| | | 341/23 |
| 2010/0117792 A1 | 5/2010 | Faith |
| 2010/0121737 A1 | 5/2010 | Yoshida |
| 2010/0125509 A1 | 5/2010 | Kranzley |
| 2010/0138666 A1 | 6/2010 | Adams |
| 2010/0149100 A1 | 6/2010 | Meiby |
| 2010/0153270 A1 | 6/2010 | Hawkes |
| 2010/0174653 A1 | 7/2010 | Tian |
| 2010/0175016 A1 | 7/2010 | Tian |
| 2010/0180336 A1 | 7/2010 | Jones |
| 2010/0182244 A1 | 7/2010 | Onda |
| 2010/0186076 A1 | 7/2010 | Ali |
| 2010/0215270 A1 | 8/2010 | Manohar |
| 2010/0223663 A1 | 9/2010 | Morimoto |
| 2010/0242104 A1 | 9/2010 | Wankmueller |
| 2010/0259561 A1 | 10/2010 | Forutanpour |
| 2010/0287097 A1 | 11/2010 | Treadwell |
| 2010/0287382 A1 | 11/2010 | Gyorffy |
| 2010/0306283 A1 | 12/2010 | Johnson |
| 2010/0323617 A1 | 12/2010 | Hubinak |
| 2011/0004769 A1 | 1/2011 | Won |
| 2011/0018033 A1 | 1/2011 | Takenaka |
| 2011/0020414 A1 | 1/2011 | Kunin |
| 2011/0055084 A1 | 3/2011 | Singh |
| 2011/0090097 A1 | 4/2011 | Beshke |
| 2011/0109567 A1 | 5/2011 | Kim |
| 2011/0144586 A1 | 6/2011 | Michaud |
| 2011/0180336 A1 | 7/2011 | Kurata |
| 2011/0185313 A1* | 7/2011 | Harpaz ................. G06F 3/0482 |
| | | 715/826 |
| 2011/0185319 A1 | 7/2011 | Carapelli |
| 2011/0191591 A1 | 8/2011 | Cheng |
| 2011/0191856 A1* | 8/2011 | Keen ....................... G06F 21/32 |
| | | 726/26 |
| 2011/0199387 A1 | 8/2011 | Newton |
| 2011/0204140 A1 | 8/2011 | Hart |
| 2011/0246369 A1 | 10/2011 | De Oliveira |
| 2011/0281630 A1 | 11/2011 | Omar |
| 2011/0310019 A1* | 12/2011 | Wilson .................. G06F 3/0238 |
| | | 345/168 |
| 2011/0313871 A1 | 12/2011 | Greenwood |
| 2011/0321138 A1 | 12/2011 | Kruger |
| 2012/0042365 A1 | 2/2012 | Shoval |
| 2012/0047564 A1 | 2/2012 | Liu |
| 2012/0079273 A1 | 3/2012 | Bacchiaz |
| 2012/0095867 A1 | 4/2012 | McKelvey |
| 2012/0096277 A1 | 4/2012 | Perez Soria |
| 2012/0098750 A1 | 4/2012 | Allen |
| 2012/0132705 A1 | 5/2012 | Golueke |
| 2012/0158672 A1 | 6/2012 | Oltean |
| 2012/0159160 A1 | 6/2012 | Poisner |
| 2012/0159582 A1 | 6/2012 | Griffin |
| 2012/0159583 A1 | 6/2012 | Griffin |
| 2012/0159592 A1 | 6/2012 | Griffin |
| 2012/0159593 A1 | 6/2012 | Griffin |
| 2012/0159594 A1 | 6/2012 | Griffin |
| 2012/0159609 A1 | 6/2012 | Griffin |
| 2012/0159613 A1 | 6/2012 | Griffin |
| 2012/0159614 A1 | 6/2012 | Griffin |
| 2012/0159616 A1 | 6/2012 | Griffin |
| 2012/0162086 A1* | 6/2012 | Rhee .................... G06F 3/04886 |
| | | 345/171 |

(56) References Cited

U.S. PATENT DOCUMENTS

| | | |
|---|---|---|
| 2012/0185398 A1 | 7/2012 | Weis |
| 2012/0222100 A1 | 8/2012 | Fisk |
| 2012/0222102 A1 | 8/2012 | Hirose |
| 2012/0249295 A1 | 10/2012 | Yeung |
| 2012/0253971 A1 | 10/2012 | Bansal |
| 2012/0256723 A1 | 10/2012 | Grover |
| 2012/0260326 A1 | 10/2012 | Steigmann |
| 2012/0291120 A1 | 11/2012 | Griffin |
| 2012/0305648 A1 | 12/2012 | Sondhi |
| 2012/0311723 A1 | 12/2012 | Britt, Jr. |
| 2012/0313858 A1 | 12/2012 | Park |
| 2012/0323788 A1 | 12/2012 | Keresman, III |
| 2013/0018800 A1 | 1/2013 | Devaraju |
| 2013/0019320 A1 | 1/2013 | Ericsson |
| 2013/0020389 A1 | 1/2013 | Barnett |
| 2013/0021233 A1 | 1/2013 | Umminger |
| 2013/0023240 A1 | 1/2013 | Weiner |
| 2013/0026513 A1 | 1/2013 | Aurongzeb |
| 2013/0029824 A1 | 1/2013 | De Koning |
| 2013/0042318 A1 | 2/2013 | Thatha |
| 2013/0047237 A1 | 2/2013 | Ahn |
| 2013/0050088 A1 | 2/2013 | Smith |
| 2013/0060739 A1 | 3/2013 | Kalach |
| 2013/0078951 A1 | 3/2013 | Mun |
| 2013/0086382 A1 | 4/2013 | Barnett |
| 2013/0091583 A1 | 4/2013 | Karroumi |
| 2013/0106690 A1 | 5/2013 | Lim |
| 2013/0117573 A1 | 5/2013 | Harbige |
| 2013/0148044 A1 | 6/2013 | Ohyama |
| 2013/0154937 A1* | 6/2013 | Park ............... G06F 3/023 345/168 |
| 2013/0154981 A1* | 6/2013 | Park ............... H04M 1/2748 345/173 |
| 2013/0159196 A1 | 6/2013 | Dizoglio |
| 2013/0198459 A1 | 8/2013 | Joshi |
| 2013/0207902 A1 | 8/2013 | Showering |
| 2013/0232549 A1* | 9/2013 | Hawkes ............. G06F 21/36 726/3 |
| 2013/0265136 A1 | 10/2013 | Wadia |
| 2013/0298246 A1 | 11/2013 | Cragun |
| 2013/0301830 A1 | 11/2013 | Bar-El |
| 2014/0002558 A1 | 1/2014 | Ramesh |
| 2014/0013252 A1 | 1/2014 | Ehrler |
| 2014/0025580 A1 | 1/2014 | Bacastow |
| 2014/0096201 A1 | 4/2014 | Gupta |
| 2014/0162598 A1 | 6/2014 | Villa-Real |
| 2014/0168083 A1 | 6/2014 | Ellard |
| 2014/0173492 A1* | 6/2014 | Yoon ............... G06F 3/04886 715/773 |
| 2014/0195429 A1 | 7/2014 | Paulsen |
| 2014/0201831 A1 | 7/2014 | Yi |
| 2014/0283022 A1 | 9/2014 | Beloncik |
| 2014/0310531 A1 | 10/2014 | Kundu |
| 2014/0324698 A1 | 10/2014 | Dolcino |
| 2014/0324708 A1 | 10/2014 | McCauley |
| 2015/0095241 A1* | 4/2015 | Edwards ............ G06Q 20/382 705/72 |
| 2015/0116225 A1 | 4/2015 | Luo |
| 2015/0154414 A1 | 6/2015 | Pike |
| 2015/0154598 A1* | 6/2015 | Forte ............... G06F 3/041 380/28 |
| 2015/0261968 A1 | 9/2015 | Polyachenko |
| 2015/0332038 A1* | 11/2015 | Ramsden ........... G06F 21/32 726/19 |
| 2015/0347774 A1 | 12/2015 | Krstic |
| 2015/0350163 A1 | 12/2015 | Brander |
| 2015/0371213 A1 | 12/2015 | Pike |
| 2015/0379288 A1 | 12/2015 | Kubik |
| 2016/0006718 A1 | 1/2016 | Huxham |
| 2016/0034718 A1 | 2/2016 | Mizrachi |
| 2016/0042190 A1 | 2/2016 | Adderly |
| 2016/0063230 A1 | 3/2016 | Alten |
| 2016/0065546 A1 | 3/2016 | Krishna |
| 2016/0125193 A1 | 5/2016 | Dai Zovi |
| 2016/0154980 A1 | 6/2016 | Neumann |
| 2016/0224771 A1 | 8/2016 | Pike |
| 2016/0246955 A1 | 8/2016 | Jiang |
| 2016/0253508 A1 | 9/2016 | Song |
| 2016/0283013 A1 | 9/2016 | Engstrom |
| 2016/0314293 A1 | 10/2016 | Pike |
| 2016/0314468 A1* | 10/2016 | Smith ............... G07F 7/1041 |
| 2016/0320965 A1 | 11/2016 | Chung |
| 2016/0337857 A1 | 11/2016 | Carron |
| 2017/0006140 A1 | 1/2017 | Park |
| 2017/0061138 A1 | 3/2017 | Lambert |
| 2017/0061408 A1 | 3/2017 | Choi |
| 2017/0140354 A1 | 5/2017 | Jenkins |
| 2017/0192670 A1 | 7/2017 | Raman |
| 2017/0235926 A1 | 8/2017 | Fyke |
| 2017/0270764 A1 | 9/2017 | Riedel |
| 2018/0032831 A1 | 2/2018 | Kim |
| 2018/0150623 A1 | 5/2018 | Pike |
| 2018/0150628 A1 | 5/2018 | Pike |
| 2018/0150629 A1 | 5/2018 | Pike |
| 2018/0150630 A1 | 5/2018 | Pike |
| 2018/0374392 A1 | 12/2018 | Ollivier |
| 2020/0005273 A1 | 1/2020 | Pike |
| 2020/0201960 A1 | 6/2020 | Pike |
| 2020/0210557 A1 | 7/2020 | Pike |
| 2020/0226235 A1 | 7/2020 | Pike |

FOREIGN PATENT DOCUMENTS

| | | |
|---|---|---|
| CN | 101126967 A | 2/2008 |
| CN | 201035502 Y | 3/2008 |
| CN | 201111222 Y | 9/2008 |
| CN | 202150070 U | 2/2012 |
| CN | 105956857 A | 9/2016 |
| CN | 106022172 A | 10/2016 |
| DE | 4129202 | 3/1993 |
| DE | 4129202 A1 | 3/1993 |
| DE | 19803339 A1 | 8/1999 |
| DE | 10100188 | 7/2002 |
| DE | 10306352 A1 | 9/2004 |
| DE | 102008050609 A1 | 10/2009 |
| DE | 102008056605 A1 | 5/2010 |
| DE | 102009022845 | 9/2010 |
| DE | 102009022845 A1 | 9/2010 |
| DE | 102009023925 A1 | 12/2010 |
| DE | 102010022368 A1 | 12/2011 |
| EP | 0432409 A1 | 6/1991 |
| EP | 0662665 A2 | 7/1995 |
| EP | 0870222 A2 | 10/1998 |
| EP | 1161060 | 12/2001 |
| EP | 1161060 A1 | 12/2001 |
| EP | 1599786 A2 | 11/2005 |
| EP | 1600847 A1 | 11/2005 |
| EP | 1615181 A1 | 1/2006 |
| EP | 1742450 | 1/2007 |
| EP | 1840778 A1 | 10/2007 |
| EP | 2141647 | 1/2010 |
| EP | 2141647 A1 | 1/2010 |
| EP | 2365469 | 9/2011 |
| EP | 2400426 A1 | 12/2011 |
| EP | 2458491 | 5/2012 |
| EP | 2458491 A2 | 5/2012 |
| EP | 2466512 A1 | 6/2012 |
| EP | 2466513 A1 | 6/2012 |
| EP | 2466514 A1 | 6/2012 |
| EP | 2466515 A1 | 6/2012 |
| EP | 2466516 A1 | 6/2012 |
| EP | 2466517 A1 | 6/2012 |
| EP | 2466518 A1 | 6/2012 |
| EP | 2466519 A1 | 6/2012 |
| EP | 2466520 A1 | 6/2012 |
| EP | 2466521 A1 | 6/2012 |
| EP | 2487620 A1 | 8/2012 |
| EP | 2512090 A1 | 10/2012 |
| EP | 2523137 A1 | 11/2012 |
| EP | 2775421 | 9/2014 |
| EP | 3163926 A1 | 5/2017 |
| EP | 3176722 A1 | 6/2017 |
| EP | 3355512 A1 | 8/2018 |

(56) References Cited

FOREIGN PATENT DOCUMENTS

| | | |
|---|---|---|
| FR | 2622322 | 4/1989 |
| FR | 2810067 | 12/2001 |
| FR | 2812423 A1 | 2/2002 |
| FR | 2819067 | 7/2002 |
| FR | 2923034 A1 | 5/2009 |
| FR | 2961330 A1 | 12/2011 |
| FR | 2969342 A1 | 6/2012 |
| GB | 2387702 A | 10/2003 |
| GB | 2388229 A | 11/2003 |
| GB | 2389693 A | 12/2003 |
| GB | 2402649 A | 12/2004 |
| GB | 2416058 | 1/2006 |
| GB | 2416058 A | 1/2006 |
| GB | 2427059 A | 12/2006 |
| GB | 2438886 A | 12/2007 |
| GB | 2454459 A | 5/2009 |
| GB | 2457733 | 8/2009 |
| GB | 2457733 A | 8/2009 |
| GB | 2520207 A | 5/2015 |
| GB | 2542512 | 3/2017 |
| GB | 2556474 | 5/2018 |
| JP | 1995271884 | 10/1995 |
| JP | 2000099801 A | 4/2000 |
| JP | 2000165378 | 6/2000 |
| JP | 2003346098 | 12/2003 |
| JP | 2003346098 A | 12/2003 |
| JP | 2004102460 | 4/2004 |
| JP | 2005107678 | 4/2005 |
| JP | 2006243938 A | 9/2006 |
| JP | 2008506198 | 2/2008 |
| JP | 2008204409 A | 9/2008 |
| JP | 2008537210 | 9/2008 |
| JP | 2009199581 A | 9/2009 |
| JP | 2009237774 A | 10/2009 |
| JP | 2010126913 A | 6/2010 |
| JP | 2010533925 | 10/2010 |
| JP | 2012138011 A | 7/2012 |
| JP | 2012194648 A | 10/2012 |
| KR | 20090130455 A | 12/2009 |
| KR | 101520803 | 5/2015 |
| KR | 20180056116 A | 5/2018 |
| WO | 9311551 | 6/1993 |
| WO | 9705578 | 2/1997 |
| WO | 0025474 A1 | 5/2000 |
| WO | 0146922 | 6/2001 |
| WO | 0146922 A1 | 6/2001 |
| WO | 02071177 A2 | 9/2002 |
| WO | 03058947 | 7/2003 |
| WO | 03058947 A1 | 7/2003 |
| WO | 03058947 A2 | 7/2003 |
| WO | 2005104428 | 11/2005 |
| WO | 2005104428 A2 | 11/2005 |
| WO | 2006010058 | 1/2006 |
| WO | WO2006/064241 A2 | 6/2006 |
| WO | 2006095203 | 9/2006 |
| WO | 2007056746 | 5/2007 |
| WO | 2007143740 | 12/2007 |
| WO | 2007143740 A2 | 12/2007 |
| WO | 2009000223 A2 | 12/2008 |
| WO | 2009009788 | 1/2009 |
| WO | 2009009788 A1 | 1/2009 |
| WO | 2009012326 | 1/2009 |
| WO | 2009130985 | 10/2009 |
| WO | 2010131218 | 11/2010 |
| WO | 2010131218 A1 | 11/2010 |
| WO | 2010134808 | 11/2010 |
| WO | 2011093998 A1 | 8/2011 |
| WO | 2011155915 | 12/2011 |
| WO | 2011155915 A1 | 12/2011 |
| WO | 12009334 A1 | 1/2012 |
| WO | 2012004395 A1 | 1/2012 |
| WO | 2012077098 A1 | 6/2012 |
| WO | 2012131420 A1 | 10/2012 |
| WO | 2012146587 A1 | 11/2012 |
| WO | 2013013192 | 1/2013 |
| WO | 2013021233 | 2/2013 |
| WO | 2013148044 | 10/2013 |
| WO | WO2014/013252 A2 | 1/2014 |
| WO | WO2014111689 A1 | 7/2014 |
| WO | 2014132193 | 9/2014 |
| WO | 2015055973 | 4/2015 |
| WO | 2015063474 | 5/2015 |
| WO | 2016046458 A1 | 3/2016 |
| WO | WO-2016048236 A1 * | 3/2016 ............ G06F 21/31 |
| WO | 2016189325 A1 | 12/2016 |
| WO | 2017065576 A1 | 4/2017 |
| WO | 2017190561 A1 | 11/2017 |

OTHER PUBLICATIONS https://patentscope.wipo.int/search/en/detail.jsf?docId=WO2016188127&tab=PCTBIBLIO&maxRec=1000 (Year: 2015).*
Examination Report of Indian Application No. 2301/KOLNP/2015 dated Oct. 18, 2019.
Anonymous, "Fujitsu Develops World's First Authentication Technology to Extract and Match 2,048-bit Feature Codes from Palm Vein Images", Fujitsu Global, Kawasaki, Japan, (Aug. 5, 2013), URL: http://www.fujitsu.com/global/about/resources/news/press-releases/2013/0805-01.html, (Aug. 1, 2016), XP055292505.
Decision to Grant for related GB2520207.
Examination Report of Application No. GB1619853.3 dated Mar. 8, 2017.
https://patentscope.wipo.int/search/en/detail.jsf?docId=W02016188127&tab=PCTBI BLIO&maxRec=1 000 (Year:2015).
International Search Report and Written Opinion of International Application No. PCT/GB2016/051548 dated Aug. 8, 2016.
International Search Report and Written Opinion of International Application No. PCT/GB2016/051549 dated Aug. 10, 2016.
International Search Report and Written Opinion of International Application No. PCT/GB2016/051550 dated Aug. 8, 2016.
International Search Report and Written Opinion of International Application No. PCT/GB2016/051553 dated Aug. 4, 2016.
International Search Report in related PCT Application No. PCT/GB2013/051913 dated Feb. 6, 2014.
Roos, "Automatically Downloading My ING Direct Transactions—Chris Roos", Jun. 23, 2007, XP055085833.
Search and Examination Report of Application No. GB1906165.4 dated Aug. 23, 2019.
Search Report in related GB Application No. GB1212878.1 dated Dec. 3, 2012.
Search Report issued by United Kingdom Intellectual Property Office dated Oct. 6, 2017 for Application No. GB1321505.8.
The Usability of Picture Passwords, FRASER, Jul. 23, 2014.
Using Biometrics to Generate Public and Private Keys, Satrugna Pakala, (May 31, 2006) Retrieved from internet; URL: http://www.sci.tamucc.edu/~cams/GraduateProjects/view. php?view=266.
Written Opinion of the Intl Searching Authority in related PCT Application No. PCT/GB2013/051913, 201 , Jan. 20, 2015.
Ciphercard: A Token-Based Approach Against Camera-Based Shoulder Surfing Attacks on Common Touchscreen Devices Authors: Teddy Seyed; Xing-Dong Yang; Anthony Tang; Saul Greenberg; Jiawei Gubin; Zhuxiang Cao.
Japanese Office Action dated Sep. 8, 2020 of application No. 2017-561754.
Scramblepad, Scrambleprox, Scramblesmart, Scramblesmartprox. Author: Hirsch Electronics Date: Jul. 27, 2013.
Search Report dated Jul. 22, 2020 of GB application No. GB1916441.7, 2 pages.
Touch Screen Remote Arming Station (RAS) Author: Tecom Date: Mar. 18, 2015.
Search Report cited in Office Action dated Nov. 26, 2019 of Russian Application No. 2017141194/08.
Translation of Office Action dated Nov. 26, 2019 of Russian Application No. 2017141194/08.
Australian Office Action dated Jan. 18, 2021 of application No. 2016269268.
Chinese Office Action dated Dec. 3, 2020 of Application No. 201680039203.9.

(56) References Cited

OTHER PUBLICATIONS

EyeDecrypt—Private Interactions in plain Sight, Forte et al., Proc. 9th Conference on Security and Cryptography for Networks (SCN 2014).
GlobalPlafform Device Technology Trusted User Interface API, Version 1.0, Jun. 2013, Document Reference: GPD_SPE_020.
Indian Office Action dated Feb. 1, 2021 of application No. 20173704209.
Indian Office Action dated Jan. 21, 2021 of application No. 201737042169.
PCI Mobile Payment Acceptance Security Guidelines for Developers, Version 1.0, Emerging Technologies, PCI Security Standards Council, Sep. 2012.
PCI Mobile Payment Acceptance Security Guidelines for Merchants as End-Users, Version 1.0, Emerging Technologies, PCI Security Standards Council, Feb. 2013.
Secure Mobile Payment on NFC-Enabled Mobile Phones Formally Analysed Using CasperFDR, S. Abughazalah et al., 2014 IEEE 13th International Conference on Trust, Security and Privacy in Computing and Communications, pp. 422-431.
Thales e-Security mPOS Secure Mobile Card Acceptance White Paper, Nov. 2013.
Australian Examination Report dated Mar. 26, 2021 from Australian Application No. 2016269265.

\* cited by examiner

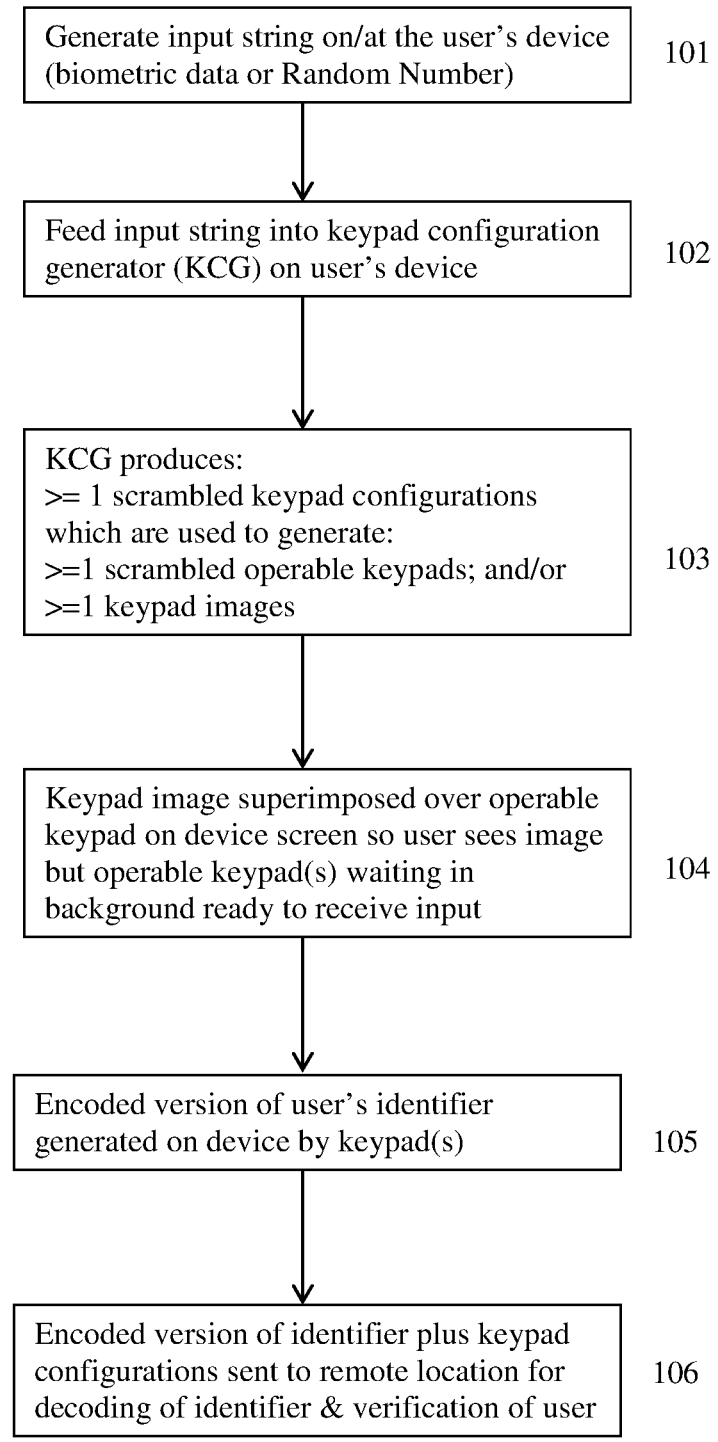

AUTHENTICATION METHODS AND SYSTEMS

CROSS-REFERENCE TO RELATED APPLICATIONS

This application is the national stage of International Patent Application No. PCT/GB2016/051548 filed on May 27, 2016, and which claims priority to British Patent Applications Nos. GB 1509030.1 filed on May 27, 2015, GB 1509031.9 filed on May 27, 2015, GB 1520760.8 filed on Nov. 24, 2015 and GB 1520741.8 filed on Nov. 24, 2015, all of which are hereby incorporated by reference in their entireties as if fully set forth herein. This application is related to the following applications: i) U.S. patent application Ser. No. 14/761,110 filed on Jul. 15, 2015; ii) U.S. patent application Ser. No. 15/576,900 filed on Nov. 27, 2017; iii) U.S. patent application Ser. No. 15/576,906 filed on Nov. 27, 2017; iv) U.S. patent application Ser. No. 15/576,910 filed on Nov. 27, 2017; v) U.S. patent application Ser. No. 14/416,054 filed on Jan. 20, 2015 (now U.S. Pat. No. 9,552,465); vi) U.S. patent application Bo. 15/094,383 filed on Apr. 8, 2016 (now U.S. Pat. No. 10,366,215); and vii) U.S. patent application Ser. No. 15/197,086 filed on Jun. 29, 2016.

BACKGROUND

1. Field

This invention relates generally to the field of user authentication. The invention is suited for use in situations where a user is required to enter an identifier or code (eg a PIN, password etc) which is validated prior to completing an operation. The operation might be any type of operation. The invention is also suited for, but not limited to, verification of the user on a mobile device such as a smartphone or tablet computer.

2. Related Art

Authentication techniques are used in a variety of situations where an individual's identity and/or authorisation needs to be verified prior to being allowed to perform an act or gain access to some controlled or managed resource such as a device, building, a computer system, a financial account, a service etc.

One common approach to authentication is to record some pre-selected identifier comprising a code or combination of symbols which is then maintained in secrecy in a secure location and available only to authorised parties. For the sake of convenience, the identifier may be referred to in this document as a Personal Identification Code (PIC) although it is important to note that the identifier may comprise other types and combinations of symbols and not just numeric digits. The term 'PIC' as used herein should not be construed as limiting the invention with respect to the type or format of the user's identifier.

After the identifier has been selected and assigned to an authorised individual (or group of individuals), the user is required to supply the correct identifier each time he requests permission to perform the controlled act or gain access to the resource or service. The user's inputted identifier is compared with the pre-stored version. If the input matches the stored identifier then the user's identity is deemed to have been verified and access is granted. Alternatively, if the input does not match the pre-stored version then access is denied.

The use of PINs has become commonplace, especially in relation to banking and financial applications. Customers have become accustomed to, and trusting of, the use of PIN-based verification. Financial institutions also favour PIN-based authentication as it provides a more secure form of verification than, for example, a signature. Further still, when a transaction requires authentication via a PIN the liability for any fraud resulting from that transaction is deemed to lie with the user who has supplied the PIN. This is in contrast to 'card not present' transactions such as on-line transactions where the liability remains with the issuing financial institution.

Another authentication approach involves using a device to capture biometric data relating to the unique physical or behavioural attributes of the individual such as iris pattern, palm geometry or fingerprint. An advantage of biometric authentication is that users do not need to remember passwords or codes, and the required information is always carried inherently by the individual wherever they go so no additional hardware such as tokens need to be carried. Therefore, biometric authentication offers a convenient and simple authentication solution which is attractive to end users.

However, despite the attractions of biometric authentication, it has yet to be widely adopted within certain industries such as the banking industry. One reason for this is that the infrastructure of the banking industry is geared towards verification using a 4 digit PIN. This includes payment terminals, ATMs, switches, and the apparatus at both the acquiring and issuing banks, which would all need to be replaced or adapted at significant cost in order to move from PIN-based to biometric authentication. Other concerns arise in relation to the security of biometric data which may be captured from non-secure sources. For example, fingerprints can be 'lifted' from public places, voices can be recorded. In addition, while it is easy to change a stored PIN or identifier it is not possible for an individual change biometric data such as fingerprint, iris pattern etc.

These concerns can be reduced by the use of two or three-factor authentication wherein at least two of the following are used during authentication:
What you know (eg PIN, password)
Who you are (eg fingerprint, retina pattern, face or voice patterns)
What you have (eg smart card, security token, mobile device)

Therefore, a system which requires a user to authenticate with both a PIN and biometric data on a device owned or operated by the user would provide enhanced security.

With respect to mobile technology, more and more people are using handheld computing devices such as smart phones and tablet computers etc for identity-sensitive operations such as banking. However, such devices are notoriously insecure and passwords, PINs and other valuable authentication data can be compromised by third parties. Therefore, there is a significant challenge in providing an authentication solution which is secure even when used on a mobile device.

One such solution has been disclosed in WO 2014/013252 which teaches the concept of sending an image of a scrambled keypad from a server to a user's device (PC, mobile phone, tablet etc). An operable, functional keypad is generated on the device and the image is displayed on the screen in the same position as the keypad. The image is superimposed over the keypad such that it is hidden from view yet still functional in the background. The positions of the underlying keypad keys do not correspond to the positions of the same 'keys' depicted in the image. To the user, only the image of the scrambled keypad is visible and thus when the user touches or clicks on part of the image to select an input, the operable keypad interprets this input differently and an encoded version of the user's input is received into memory on the device. Thus, as the user's real identifier (eg PIN) is never entered into the keyboard buffer or elsewhere on the device it cannot be fraudulently obtained from it. The encoded identifier is then transmitted to a remote server which knows the order of keys depicted in the keypad image, and can thus decode the user's input. In effect, a mapping is created between the keypad configurations, and this mapping is used to both encode and decode the identifier. This solution provides significant advantages over other authentication techniques, because it does not require the user to remember a different identifier, does not require the use of special or additional hardware, and avoids entry of the user's real identifier into an insecure device.

EP 1615181 A1 discloses an authentication method wherein a random string is fed into an 'image generator' component. The image generator takes the random string and generates image data suitable for display on a client terminal. The image data is then used to change the appearance of the display on the terminal so as to present the user with a plurality of characters and the user then inputs his PIN by selecting characters. Each input selected by the user is recorded as positional data by the client terminal (e.g. first row, second column). This positional data is then converted by the client terminal into character data eg the numeral 2. In contrast to the WO 2014/013252 arrangement, there is no use of an operable keypad, masked by an overlying image, to perform the encoding during entry. Instead, a customised algorithm is used to post-process the positional data into an encoded version of the user's input.

SUMMARY

An alternative solution has now been devised.

Thus, in accordance with the present invention there is provided an authentication solution as defined in the appended claims.

In accordance the invention there is provided a verification method and corresponding system. The invention may be used to verify (authenticate) a user's identity. The verification may be performed prior to granting access to some controlled resource or service. Thus, the invention may provide an enhanced security mechanism.

The method may comprise the steps of:
presenting at least a portion of a keypad image over at least a portion of an operable keypad within a display zone of a screen associated with an electronic device; wherein the keypad image and/or the operable keypad are generated using at least one scrambled keypad configuration generated on or at the electronic device.

Thus, the image and the keypad may be provided within the same display zone of the same screen. The user may enter or input an identifier by selecting a portion of the image. This may cause an encoded version of the user's identifier to be generated and entered into the device by the operable keypad. Thus, no post-entry transformation or processing of the identifier or its positional data is required in order to encode or translate it.

One or more scrambled keypad configurations may be generated on or at the electronic device itself. The at least one scrambled keypad configurations may then be used to generate at least one operable keypad and/or at least one keypad image. The keypad image and/or operable keypad may also be generated on or at the electronic device.

This is in contrast to the prior art which teaches that one or a plurality of scrambled keypad configurations are sent from a remote server to the electronic device. Advantageously, in accordance with the invention, the workload is transferred from the remote resource to the local device. It also avoids the need for transmittal of the configuration(s) to the device and so avoids interception. Thus, the present invention provides a more efficient and more secure solution than the prior art.

Additionally or alternatively, the scrambled keypad configuration may be used to generate the keypad image on or at the electronic device, rather than the image being sent to the device from a remote computing resource such as a server.

The keypad configuration(s) may be used to generate a PED (Pin Entry Device). The PED may be formed on the electronic device.

The operable keypad may be generated by executing a subroutine such as a function, method or procedure on the electronic device. The subroutine may be part of a library. The library may be provided as standard to the electronic device. Execution of the subroutine may cause a keypad object to be generated in volatile memory on the electronic device. The keypad object may be a virtual, electronic model of a mechanical keypad. The operable keypad may be or comprise an event handler (or "event listener" in some alternative programming terminologies). The event may be a keyboard event, a touchscreen event or some other input-related event.

The phrase 'on or at' may be interpreted as meaning that the scrambled keypad configuration is generated by the electronic device itself, or by one or more devices which are associated with the electronic device eg by physical or wireless connection to the electronic device. The scrambled keypad configuration is therefore generated locally to the electronic device (client) rather than being received from a remote resource (server).

The phrase 'keypad configuration' may be used herein to refer to the order, arrangement or position of keys in a keypad. It may also be used to refer to the order of 'keys' as depicted in the keypad image although it should be noted that in reality the image does not actually comprise operable 'keys'. The term 'scrambled' may be used to mean that the keys in a keypad configuration are altered relative to a reference configuration.

The keypad image may be an image of a non-scrambled keypad. The operable keypad may be generated using at least one scrambled keypad configuration (i.e. the operable keypad may be 'scrambled'). The non-scrambled image may be a representation of a keypad which is a default or expected layout and design for the device. Thus, the 'keys' depicted in the non-scrambled image may be in a sequential order as expected by the user in conformity with, for example, the standard keypad of the device. The standard keypad may be generated by an operating system or software component supplied with the device by the manufacturer. The image of the non-scrambled keypad may be "superimposed" over a scrambled operable keypad to generate a mapping between the keys depicted in the image and the operable keys of the underlying functional keypad.

Alternatively, the position of the 'keys' depicted in the image may be scrambled while the position of the functional keys in the underlying keypad may be non-scrambled. In yet another embodiment, the layout of the keys in both the image and the operable keypad are scrambled. In any event, a mapping is generated between the position of keys depicted in the image and the functional keys of the keypad.

Preferably, the scrambled keypad configuration is generated on or at the electronic device by a software component, which may be referred to as a keypad generation component (KGC), and may be arranged to generate the image(s) and/or operable keypad(s). Additionally or alternatively, it may be arranged to generate one or more configurations for specifying the arrangement of keys in the image(s) or operable keypad(s). It may be installed on the electronic device after download from a remote resource ie remote with respect to the electronic device. The remote resource may be a server. It may be a cloud-based resource.

The software component may be configured to receive an input. It may be configured to use the input to provide one or more keypad configurations for use in generation of the keypad image(s) and/or operable keypad(s). The input may be a pseudo or true random number, or it may be biometric data related to a user. The user may or may not be associated with the electronic device.

The keypad image may be a representation of a keypad. It may be a static image or a moving image. It may comprise a watermark. It is distinct and distinguishable from the operable keypad in that the image resembles a keypad but does not comprise any keypad functionality. Therefore, while portions of the image may represent or depict 'keys', and may appear as such to the user, the image itself or portions thereof do not possess any operable properties. Thus, clicking on, touching or otherwise selecting a portion of the keypad image may not, in itself, result in an input being received by the electronic device. In one or more embodiments, one or more keys depicted in the image may be colour coded, watermarked or otherwise tagged to provide a visual assurance to the user that the image has been provided by a legitimate source.

By contrast, the operable keypad comprises the functionality and properties which the skilled person would associate with a functioning keypad. Thus, the operable keypad may comprise a plurality of keys or buttons. The keypad is configured such that each key or button has a value (eg digit, letter or other symbol) associated with it. This assignment of values to keys is typically performed upon creation of the keypad (at run time) but the associations may be changed after creation if the keypad is re-configurable. In either event, the association of values to keys is performed prior to entry of the user's input such that when the user selects a given key, its pre-defined value is put into a portion of memory in the electronic device. The portion of memory may be a keyboard buffer.

The invention may enable the user to provide an input to the electronic device by operating one or more keys of the operable keypad via or through the image. The keypad image may be superimposed over the operable keypad in the sense that the operable keypad is provided (presented) within the display zone of the screen but the image is presented at least partially within the same display zone and thus obscures or masks the operable keypad from the user's view.

The operable keypad may be listening in the background, waiting for an input, even though the user cannot see it. Preferably, the image masks the operable keypad completely so the user appears to see an operable keypad but in reality is only able to see an image of a keypad. Preferably, the symbols on the operable keys of the underlying keypad may not correspond to the position of the 'keys' as shown in the keypad image. In other words, the configuration of the operable keypad may not match or be the same as the configuration of the keypad depicted in the image. Thus, when the user selects what appears to be a key in the keypad image, the operable keypad active within the display zone may cause a different symbol to be entered into the device's memory. In this manner, the user's real (ie intended) input may never be received into any portion of the device's memory. It may never be received by the keyboard buffer. An encoded version of the identifier is created due to the mapping between the different configurations used to generate the keypad and the image.

This feature provides the significant advantage that the user's real input cannot be obtained by any party who has gained unauthorised access to the electronic device. It also distinguishes the invention over known solutions wherein data such as positional data or an identifier is received from the user into memory and then translated into an encoded version of the user's input. In effect, it is the user who encodes the input when using the present invention, rather than the invention itself.

One or a plurality of operable keypads may be generated on the electronic device during an authentication session. Additionally or alternatively, one or a plurality of keypad images may be generated during the session. One or more images and/or keypads may be generated from one (scrambled) keypad configuration.

In one or more embodiments, a plurality of operable keypads and/or keypad images may generated. They may be arranged or ordered in a series, stack or queue or other data structure.

One keypad in the plurality may be designated or selected as the active operable keypad for receiving input from a user. The active operable keypad may be the keypad which is provided 'beneath' the image such that when the user selects a portion of the image on the screen, the active operable keypad is caused to function. Preferably, there is only one active keypad at any given point in time. The remaining operable keypads in the plurality may be dormant or inactive until designated as the active keypad. Thus, a plurality of operable keypads may be generated and placed into a data structure. The data structure may be iterated over so that the operable keypad designated as the active one changes over time. The change may be effected following a certain period of time or after an event such as an input being received from a user. Thus, after an input from the user, the active operable keypad may be replaced or exchanged for another operable keypad in the plurality. The previously active keypad may be erased from memory, or marked for removal, once it has become inactive. Thus, once an input (keystroke) has been received using a particular operable keypad it may be deleted from the electronic device.

Alternatively, rather than cycling through a plurality of pre-generated operable keypads, a new operable keypad may be generated for each input when needed. Each newly generated operable keypad may comprise a different configuration of keys from the others. A new operable keypad may be generated when an input is expected or required from the user. For example, if the identifier is four digits long a first keypad may be used for receipt of the first input, then second keypad generated for receipt of the second input and so on for all four inputs.

Further still, a mutable (changeable) keypad may be provided in addition to or instead of a plurality of operable keypads. The configuration of the mutable operable keypad may be altered after or upon an event such as receipt of an input from a user, or after a certain period of time. Thus, the same operable keypad may remain as the active one, but the arrangement of the keys may change. The scrambled keypad configurations may be used to determine the different configurations of the keypad.

The scrambled keypad configuration(s) may be generated using a true random number generator or pseudo random number generator. The true or pseudo random number (hereinafter simply 'the random number') may be fed as input into the software component referred to as the keypad configuration component. Thus, when using a random number as input to the configuration component, different keypad configuration(s) may be produced each time the invention is used by the same user.

Preferably, the random number is generated locally to the electronic device. It may be generated on the processor of the electronic device or using a device which is in local communication (wired or wireless) with the device. Thus, it may be generated by a plug-in device or a device connected to the electronic device via a wireless protocol such as Bluetooth, NFC etc.

The scrambled keypad configuration may be generated using biometric data related to a user. In this document, the phrase "biometric data" may be used to mean data which is captured directly from the user (i.e. "raw" biometric data such as may be captured by a sensor). It may also mean biometric data which has been derived from a biometric capture process. For example, it may be processed data which has been obtained or derived following a biometric authentication process.

The biometric data may be generated or captured in a variety of ways. As with respect to the random number generation above, it is preferably generated by the electronic device or locally to the electronic device. The biometric data may comprise any form of data relating to a physical or behavioural attribute of the user. It may comprise data relating to a fingerprint, iris pattern etc. The invention is not to be limited with respect to the type of biometric data used or the manner in which it is collected or processed. Various biometric data capture and analysis systems are known in the art and considered to be suitable for use with the present invention.

The biometric data may be processed to provide a sequence or identifier which is unique to the user. The sequence may be a string of values or characters. This string may be fed into the software component (KGC) so as to specify the order of keys in one or more operable keypads and/or images generated by or at the electronic device. Thus, when using biometric data as input to the software component, the same keypad configuration(s) may be produced each time the invention is used by the same user. The keypad generation component may be arranged to generate a Pin Entry Device (PED). This may be a virtual, non-physical PED.

Additionally or alternatively, some other form of data may be used as the input to the keypad configuration algorithm. This data may be derived from or in some way related to the user's biometric data. It may be, for example, a cryptographic key. The cryptographic key may be used to generate the seed. The key may be a private or public cryptographic key which is associated with a user and/or a digital wallet associated with a user. The wallet may be stored on the electronic device. The cryptographic key may have been generated during a biometric authentication process, or a registration process involving the capture of the user's biometric data.

The electronic device may be a mobile and/or handheld device such as a smart phone, tablet, payment terminal, payment card reader or smart-card reader. Additionally or alternatively, it may be a personal computing device associated and/or registered with a user. This distinguishes the invention over those prior art arrangements which are designed for use with non-personal computing devices such as ATM machines. The term 'personal computing device' is used herein to refer to an electronic computing device, such as a PC, laptop, mobile phone, tablet computer which can be associated with, registered to, and/or owned by an individual.

Preferably, the operable keypad and/or the keypad image is erased from the device following input from a user, or following a specified period of time. The position of the display zone on the screen, and/or its dimensions, may be specified by a procedure or method call. The display zone may comprise a plurality of sub-zones, each sub zone corresponding to a keypad key. The sub-zone may be referred to as 'hot spots'. Thus, selection of a particular hot spot on the screen may cause a key of the active, operable keypad to be activated such that an (encoded) input is placed into memory.

Preferably, the method comprises the step of storing an encoded version of a user's identifier in memory associated with the electronic device, the identifier being received by the operable keypad via the keypad image such that the user's identifier is never stored on the device in an un-encoded form.

It may comprise the steps of storing an encoded version of an identifier entered into the electronic device by the operable keypad via the keypad image; and transmitting the encoded version of the identifier to a remote computing resource.

The scrambled keypad configuration may be transmitted to the remote computing resource. A plurality of scrambled keypad configurations may be sent to the remote computing resource. The remote computing resource eg server may decode the encoded version of the user's identifier. It may use one or more scrambled keypad configurations to decode the encoded version of the user's identifier.

The invention may be arranged to generate one keypad configuration for each value in the user's identifier. Additionally, it may generate a keypad configuration for use in generating a keypad image.

The invention also provides an electronic computing apparatus arranged and configured to implement the method described above. The apparatus may comprise a screen and at least one software component arranged and configured to perform any version of the method described above. The screen may be a touch screen.

The apparatus may comprise or be associated with:
a true random number generator and/or a pseudo random number generator;
means for capturing or generating biometric data related to a user; and/or
means for reading data from a smart card. The smart card may be a payment card. It may be any type of IC card which is independent of the operation of the device ie it may not be a SIM card.

The invention also provides a verification method comprising the steps of:
using biometric data related to an individual to generate a keypad configuration;
using the keypad configuration to generate an operable keypad and/or a keypad image. Any or all of the features described above may also apply to this aspect of the invention.

Preferably, the keypad configuration is a scrambled keypad configuration. Thus, the order of keypad keys specified by the configuration may be altered relative to a default or reference configuration.

The method may include the steps of:
capturing, generating or receiving the biometric data on or at an electronic device;
generating the operable keypad and/or keypad image on or at the electronic device.

The invention also provides an electronic payment device comprising:
a touch screen;
a component arranged to read a payment card or other IC card; and
software arranged to:
generate at least one keypad configuration from biometric data related to an individual, and/or a true or pseudo random number; and
generate a keypad image and/or operable keypad using the at least one keypad configuration.

Preferably, the payment or other IC card is separate to the electronic device. It may be physically independent of the electronic device. It may be a financial card such as bank or credit card. Preferably it does not provide functionality for the device. Preferably, it is not a SIM card.

Also in accordance with the invention there is provided a verification method comprising the steps of:
displaying a keypad image over a first operable keypad within a zone of a screen associated with an electronic device;
using the first operable keypad to obtain a first keystroke from a user; and
using at least one further keypad to obtain at least one further keystroke;
wherein the configuration of the first and/or at least one further operable keypad, and/or the configuration of the keypad image, is determined using an input sequence generated on or captured locally to the electronic device.

Any or all of the features described above may also apply to this aspect of the invention.

The image may be superimposed over the operable keypad as described above in relation to other aspects of the invention. Thus, the user may see the keypad image instead of the operable keypad such that when the user selects a portion of the image, the operable keypad is caused to function. Thus, the method enables an encoded version of the user's input to be received by memory (eg keyboard buffer).

A plurality of operable keypads may be generated on the electronic device. At any given time, one operable keypad may be selected or arranged as the active keypad. The active keypad may be the one which is executed by the device so as to obtain the next keystroke from the user.

The input sequence may be a pseudo random number.

Additionally or alternatively, the input sequence may be generated using biometric data related to the user.

An encoded version of an identifier may be constructed. The encoded identifier may comprise the first keystroke. It may comprise the at least one further keystroke. The identifier may be a code, password or other any other type of identifier associated with the user.

The first operable keypad may be a scrambled keypad. The scrambled keypad may comprise a configuration of keys which are in a randomised order or a different order relative to a default or reference keypad configuration. A different scrambled, operable keypad may be used to obtain each keystroke obtained from the user. Each operable keypad in the plurality may be different from the others in the plurality in the sense that it is a separate, distinct operable keypad. Alternatively, only one mutable, operable keypad may be generated and the order of keys reconfigured for each keystroke. Thus, the keypads may be different in the sense of having different key configurations.

The electronic device may be a mobile or handheld device such as a smart phone, laptop computer, tablet computer or payment terminal. The electronic device may comprise software and/or hardware capabilities for reading data from a card. The card may be an IC or smart card such as a payment card. The card may be independent to the operation of the electronic device. In other words, the card is not a SIM card or other 'card' integral to the operation of the device.

One or more aspects of the invention may be described as providing a two-factor authentication solution. It may provide a solution wherein:
1) The identity of the user is verified using biometric data; and
2) The user's authorisation to perform the transaction is verified by entry of a correct, pre-selected identifier.

It is important to note that for the sake of brevity and clarity, some features described above in relation to one aspect of the invention may not have been repeated in relation to other aspects of the invention. However, any feature mentioned above in relation to one aspect of the invention may be equally applicable to any other aspect of the invention.

These and other aspects of the present invention will be apparent from and elucidated with reference to, the embodiment described herein.

An embodiment of the present invention will now be described, by way of example, and with reference to the accompanying drawings.

BRIEF DESCRIPTION OF THE DRAWINGS

FIG. 1 shows a flowchart illustrating one possible embodiment in accordance with the method of the invention.

DETAILED DESCRIPTION

The invention provides a secure authentication solution for verifying the identity of an individual. The invention may be used as part of a wider authentication process or system not described herein.

In one embodiment, the present invention provides an alternative solution to the authentication technique described in WO 2014/013252 which involves presenting an image of a scrambled keypad on a user's electronic device eg mobile phone such that it obscures an operable keypad from the user's view. The user, therefore, sees what appears to be an operable keypad, but in fact is simply an image devoid of functionality.

The operable keypad underlying the image comprises keys or buttons which have symbols assigned to them, as is known in the art. The user enters his/her identifier eg PIN or PIC by selecting portions of the screen (which depict 'keys') corresponding to the symbols in the identifier. The operable keypad which has been generated behind the image detects the user's key strokes and enters the symbols assigned to the keypad's selected keys into the buffer. As a mapping is generated between the keys of the keypad and the "keys" of the image, this allows an encoded version of the real identifier to be constructed and sent to a remote server for verification. It is important to note that the invention does not perform a translation or encoding operation on the user's input as is known in some prior art arrangements. In such known systems, the 'real' identifier is entered into the keyboard buffer before being encoded. This enables unauthorised parties to access the user's identifier via the buffer. The invention, however, avoids this problem by never storing the real version of the identifier, even temporarily in the buffer.

As the order of the keys in the operable keypad is different from the order of the keys depicted in the image, the user's 'real' input is never actually entered into memory on the phone. This provides the significant benefit that the real identifier cannot, therefore, be derived by an unauthorised party from the phone. Further still, unless someone knows the configuration of keys in both the operable keypad and the keypad image, they cannot decode the encoded identifier.

The present invention provides several new and inventive features. Firstly, according to the present invention, the keypad image and/or the configuration of keys for the operable keypad are generated on the user's device rather than being sent to the device from a remote server. This provides the advantage that the processing work is transferred to the client (user's) device rather than server.

Secondly, the invention provides novel and inventive techniques for generating the keypad/image configuration(s). A software component installed on the user's device receives an input. It uses that input to determine the configuration of keys for one or more operable keypads. Additionally or alternatively, it uses the input to determine the configuration of 'keys' to be depicted in one or more keypad images. The operable keypad(s) and/or keypad image(s) can then be generated using the configurations specified by the software component.

In one embodiment, the input to the generation component is a random number. In another embodiment, the input is (or is derived from or related to) biometric data relating to the user. The biometric data can be a fingerprint, for example. The skilled person will readily understand that any type of biometric data can be used. The invention is not limited with respect to the format, type or method of capture of the biometric data.

If a random number is used as input, the resulting configuration(s) will be different each time the invention is used. If, however, biometric data is used as the input, the resulting configurations will be the same each time the invention is used. This is because the user's biometric data eg fingerprint, retina pattern etc remains constant and will always provide the same input.

In either embodiment, the input is generated on, by or at the user's device. In other words, it is generated locally to the user's device rather than by a remote resource. The input may be generated by one or more components which comprise part of the user's device, or are in proximity to the user's device and connected thereto by a physical or wireless interface.

In use, the user registers with a system in accordance with the invention. The requisite software is then downloaded to the user's device, including the generation component. Hereinafter, the user's device will be referred to as a mobile phone but any electronic device with computing capabilities may be used.

When the user's identity needs to be verified, the required input is generated either by a random number generator or by a biometric capture device. For example, the user may press a finger against the screen of the phone, or may look into a camera, or speak into a microphone etc. The biometric capture device generates a string which represents the captured biometric property.

The biometric data or random number (string) is then fed into the generation component. In another embodiment, data relating to or derived from biometric data is fed into the generation component, either instead of or as well as the biometric data. For example, a public or private cryptographic key may be used. The cryptographic key may have been generated during, for example, a wallet creation or registration process which involved capture of the user's biometric data.

The generation component then uses the input to generate a plurality of keypad configurations. Preferably, the order of symbols or values in each of the configurations is unique such that no configuration is duplicated. The keypad configurations may be generated from the random or biometric string using values or substrings selected from the string. For example, the first ten values of the string may be used for the first 10-digit keypad configuration, the next ten values may be used for the second configuration and so on. Thus, the component must ensure that the input string is of sufficient length to provide the required values for the keypad configurations.

In an illustrative embodiment using a keypad comprising the digits '0' through to '9', there will be ten values (ie characters, digits or symbols) in each configuration generated by the invention. The number of configurations generated will be the number of values in the user's identifier plus one. This will enable one scrambled, operable keypad to be generated per keystroke required from the user to enter the identifier, plus one for the keypad image. For example, in an embodiment wherein the user's identifier consists of 4 values, the configuration generation component will produce 5 configurations: one for each digit in the identifier and one for generation of the image that the user will see.

Only one operable keypad is 'active' at any given time. Thus, when the user selects (what appears to be) a key on the image, only the active keypad is able to detect the user's input. In an embodiment wherein a plurality of operable keypads has been pre-generated by the device at the start of an authentication session, only one is designated, arranged or executed so as to be the active operable keypad for receipt of the user's next keystroke. After receipt of an input, the active keypad may be altered in some way (eg the keys may be reconfigured) or may be deselected as the active keypad (eg by deletion from memory or removal from the stack).

It should be noted, though, that the user's identifier can be any type or length of identifier, comprising any type of value. It may not be limited to a 4-digit numeric PIN.

Further still, it is important to note that in some embodiments, the image may be an image of a default (non-scrambled) keypad. Thus, the 'keys' depicted in the image may be in a sequential order as expected by the user in conformity with, for example, the standard keypad of the device. The skilled person will readily understand that the image of the non-scrambled keypad is "superimposed" over a scrambled keypad to generate the mapping as described above.

Further, only one underlying, operable keypad may be generated and used to receive all keystrokes from the user. In other embodiments, however, a plurality of scrambled keypad images may be used over the top of one or more operable keypads. The image may be changed after each input (keystroke) from the user, or may be changed after a predetermined event such as three incorrect attempts.

Turning to FIG. 1, the general concept utilised by the invention may be expressed as follows.

1. Generate an input string on or at the user's device using biometric data capture or random number generation—see FIG. 1, step 101.
2. Feed the input string into a keypad generation component (KGC)—step 102
3. The generation component uses the input string to generate 5 keypad configurations step 103
4. Use one of the keypad configurations to generate and display an image of a scrambled keypad, and use the remaining configurations to generate 4 scrambled, operable keypads to underlie the image;
   superimpose the image 'over' the active operable keypad so that when the user provides an input (keystroke) via the image, the active keypad reads an input into the buffer—step 104
5. Construct encoded version of user's identifier from multiple inputs detected by operable keypad(s)—step 105
6. Send encoded version of user's identifier and 5 keypad configurations to remote location for decoding—step 6.

In one implementation, the keypad configurations which are derived from the (random or biometric) input string can be used as inputs to procedure calls which are executed and placed onto the runtime stack.

An illustration of one embodiment of the invention might be expressed as follows:

```
String input            // input (RN/biometric) used to generate keypad configurations
String usersInput       // (encoded) identifier built from user's keystrokes
int p = 10              // number of keys on keypad
int start = 0           // index of start of substring in input
int end = p − 1         // index of end of substring in input;
input = getInput( )     // get input String somehow: random number or biometric data
// display image of scrambled keypad using first p chars from input
generateandDisplayImage(input.substring(start, end))
// increment start and end indices in the input String
start = start + p
end = end + p
for (int i = 0; i < N; i++){      // N == length of PIN
    // generate a new keypad using next p values from input
    Keypad k = new Keypad(input.substring(start, end))
    //get user's keystroke and add to return String
    usersInput.concat(k.getKey Stroke( ))
    // increment start and end indices in the input String
    start = start + p
    end = end + p
}
return usersInput // send user's encoded input for decoding and verification
```

In the above illustration, a new keypad is generated as and when required for each expected keystroke. In an alternative implementation, a plurality of keypads with different configurations may be pre-generated at the start of the session and placed into a data structure. The encoded result can then be generated by iterating over that the data structure.

```
Stack keypads                       // data structure to hold the keypads
for(int i = 0; i < N; i++){
    //populate the Stack of keypads
    keypads.push(new Keypad(input.substring(start, end))
    // increment start and end indices in the input String
    start = start + p;
    end = end + p;
}
for(int i = 0; i < N; i++){         // iterate over the Stack, one key
                                    stroke per keypad
    String temp = keypads.pop( ).getKeyStroke( )
    usersInput.concat(temp)   // build encoded version of user's input
}
```

In yet another implementation, only one mutable, operable keypad object may be generated. The plurality of configurations may then be used to alter the order of the keys in the same operable keypad after each keystroke has been detected.

Once the user's encoded identifier has been constructed, it can be sent to a remote server for comparison against the stored version of the identifier. In order to decode the identifier, the server needs to know the mapping of the keys in the keypad(s) and image. Therefore, the keypad configurations generated by the user's device are also sent to the server.

The invention may be implemented on a payment terminal. The payment terminal might incorporate a card-reading component so that data can be read from the chip and/or magnetic strip of an IC card. The payment terminal is a dedicated device for processing payments and authenticating a user for such transactions. Therefore, such a payment terminal is not a general purpose computing device such as a smart phone or PC. In other embodiments, the invention can be implemented on a mobile phone, tablet computer, personal computer, lap top etc.

Therefore, the invention provides a secure authentication solution even when implemented on a mobile device. The generation of the keypad configurations on the user's device provides the benefits that processing is performed locally rather than remotely. The combination of biometrics with identifier eg PIN provides a multi-factor authentication which requires the user to be identified on the device ('who the user is') and then authenticated by identifier ('what the user knows'). This alleviates security concerns relating to the use of biometric authentication alone.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A verification method comprising:
presenting a keypad image over an operable keypad within a display zone of a screen associated with an electronic device, wherein the keypad image depicts a first plurality of keys each having a symbol or value associated therewith, wherein the operable keypad comprises a second plurality of keys each having a symbol or value associated therewith, and wherein at least one of the keypad image and the operable keypad are generated on or at the electronic device using at least one scrambled keypad configuration generated on or at the electronic device; and
generating an encoded version of a user's identifier on or at the electronic device based on user interaction with the first plurality of keys depicted in the keypad image and a mapping between the first plurality of keys depicted in the keypad image and the second plurality of keys of the operable keypad;
wherein the keypad image functions as a mask or cover superimposed over the operable keypad such that user selection of a given key of the keypad image operates to select a corresponding key of the operable keypad, and the operable keypad is obscured or masked from the user's view.

2. The method according to claim 1, wherein:
the keypad image is an image of a non-scrambled keypad, and the operable keypad is generated using at least one scrambled keypad configuration.

3. The method according to claim 1, wherein:
the scrambled keypad configuration is generated on or at the electronic device by a software component.

4. The method according to claim 3, wherein:
the software component is at least one of: i) configured to receive an input and use the input to provide one or more keypad configurations for use in generation of the keypad image and/or operable keypad; and ii) installed on the electronic device after download from a remote resource.

5. The method according to claim 1, wherein:
the operable keypad is one of a plurality of operable keypads generated from the scrambled keypad configuration.

6. The method according to claim 5, wherein:
the plurality of operable keypads are arranged or ordered in a series, stack, queue or other data structure.

7. The method according to claim 5, wherein:
one keypad in the plurality of operable keypads is designated or selected as an active operable keypad for receiving user input.

8. The method according to claim 7, wherein:
at least one of: i) the selection or designation of the active operable keypad is changed such that another operable keypad becomes selected or designated as the active operable keypad; and ii) the configuration of the keys on the operable keypad is altered to provide a different ordering or arrangement of keys.

9. The method according to claim 5, further comprising:
re-ordering or altering the plurality of operable keypads after receiving user input.

10. The method according to claim 1, wherein:
the scrambled keypad configuration is generated using a true random number generator or pseudo random number generator.

11. The method according to claim 1, wherein:
the electronic device is at least one of: i) a mobile device; and ii) a personal computing device associated with a user.

12. The method according to claim 11, wherein:
the mobile device includes at least one of a smart phone, tablet, payment terminal, and smart-card reader.

13. The method according to claim 1, wherein:
at least one of the operable keypad and the keypad image is erased from the electronic device following user input, or following a specified period of time.

14. The method according to claim 1, wherein:
at least one of the position of the display zone on the screen and its dimensions are specified by a procedure or method call.

15. The method according to claim 14, wherein:
the procedure call causes a keypad object to be created in volatile memory on the electronic device.

16. The method according to claim 1, wherein:
the display zone comprises a plurality of sub-zones, each sub zone corresponding to a keypad key.

17. The method according to claim 1, further comprising:
storing the encoded version of the user's identifier in memory associated with the electronic device such that the user's identifier is never stored on the electronic device in an un-encoded form.

18. The method according to claim 1, further comprising:
storing the encoded version of the user's identifier in memory associated with the electronic device; and
transmitting the encoded version of the user's identifier to a remote computing resource.

19. The method according to claim 18, further comprising:
transmitting the scrambled keypad configuration to the remote computing resource.

20. An electronic computing apparatus comprising:
a screen; and
at least one of a software and hardware component configured to perform the method of claim 1.

21. The apparatus according to claim 20, further comprising at least one of:
a true random number generator and/or a pseudo random number generator; and
means for reading data from a smart card.

22. The method according to claim 1, wherein:
the keypad image is one of a plurality of keypad images generated from the scrambled keypad configuration.

23. The method according to claim 22, wherein:
the plurality of keypad images are arranged or ordered in a series, stack, queue or other data structure.

24. The method according to claim 1, wherein:
the operable keypad is a scrambled keypad that is generated using at least one scrambled keypad configuration, wherein the scrambled keypad includes at least one key whose positional layout is different from a corresponding key depicted by the keypad image.

25. The method according to claim 24, wherein:
the scrambled keypad includes at least one key that is associated with a given symbol or value and that is positionally re-ordered or reconfigured relative to layout of a corresponding key depicted by the keypad image and associated with the given symbol or value.

26. A verification method comprising:
presenting a keypad image within a display zone of a screen associated with an electronic device, wherein the keypad image depicts a first plurality of keys each having a symbol or value associated therewith; and
generating an encoded version of a user's identifier on or at the electronic device based on user interaction with the first plurality of keys depicted in the keypad image and a mapping between the first plurality of keys depicted in the keypad image and a second plurality of keys of an operable keypad, wherein the second plurality of keys each having a symbol or value associated therewith, wherein the first plurality of keys depicted in the keypad image cover the second plurality of keys of the operable keypad such that user selection of a given key depicted in the keypad image operates to select a corresponding key of the operable keypad, wherein the operable keypad is obscured or masked from the user's view, and wherein at least one of the keypad image and the operable keypad are generated on or at the electronic device using at least one scrambled keypad configuration generated on or at the electronic device.

27. The method according to claim 26, wherein:
the operable keypad is a scrambled keypad that is generated using at least one scrambled keypad configuration.

28. The method according to claim 27, wherein:
the scrambled keypad includes at least one key that is associated with a given symbol or value and that is positionally re-ordered or reconfigured relative to layout of a corresponding key in the operable keypad that is associated with the given symbol or value.

29. The method according to claim 26, wherein:
each respective key of the first plurality of keys depicted in the keypad image and a corresponding key of the second plurality of keys of the operable keypad share a common location within the display zone.

30. The method according to claim 26, wherein:
the display zone comprises a plurality of sub-zones, each sub-zone corresponding to a key of the operable keypad.

31. The method according to claim 30, wherein:
the keypad image is presented to the user such that a position of at least one key of the first plurality of keys depicted in the keypad image corresponds to a position of a sub-zone, thus providing the mapping between the first plurality of keys depicted in the keypad image and the second plurality of keys of the operable keypad.

32. The method according to claim 26, wherein:
the user interaction with the screen involves touching a portion of the screen or selecting an area of the screen using a pointing device.

33. The method according to claim 26, wherein:
a configuration or an order of the second plurality of keys in the operable keypad is altered after at least part of the user's identifier has been inputted.

34. The method according to claim 26, wherein:
the encoded version of the user's identifier is generated on or at the electronic device by selection of a number of keys of the second plurality of keys of the operable keypad activated by user interaction with corresponding keys of the first plurality of keys of the keypad image.

35. The method according to claim 26, wherein:
the user's identifier is a Personal Identification Code or Personal Identification Number.

36. The method according to claim 26, wherein:
the user's identifier is used to authenticate the user for a transaction.

* * * * *